United States Patent
Henry (10) Patent No.: US 10,621,709 B1
(45) Date of Patent: Apr. 14, 2020

(54) ENHANCING IMAGE QUALITY BASED ON CHARACTERISTICS OF A REFERENCE REGION OF INTEREST

(71) Applicant: Rockwell Collins, Inc., Cedar Rapids, IA (US)

(72) Inventor: Daniel J. Henry, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 213 days.

(21) Appl. No.: 15/491,332

(22) Filed: Apr. 19, 2017

Related U.S. Application Data (60) Provisional application No. 62/473,258, filed on Mar. 17, 2017.

(51) Int. Cl.
| | | |
|---|---|---|
| *G06T 5/00* | (2006.01) | |
| *B64D 47/08* | (2006.01) | |
| *G06T 1/00* | (2006.01) | |
| *G06T 5/50* | (2006.01) | |
| *H04N 5/243* | (2006.01) | |
| *H04N 7/18* | (2006.01) | |
| *H04N 5/33* | (2006.01) | |
| *H04N 9/07* | (2006.01) | |

(52) U.S. Cl.
CPC .............. *G06T 5/007* (2013.01); *B64D 47/08* (2013.01); *G06T 1/0064* (2013.01); *H04N 5/243* (2013.01); *H04N 5/332* (2013.01); *H04N 7/183* (2013.01); *H04N 9/07* (2013.01); *B60R 2300/30* (2013.01); *G06T 5/50* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,579,591 A | * | 12/1951 | Ley ........................ | H04B 7/185 455/11.1 |
| 5,838,239 A | * | 11/1998 | Stern ...................... | B64D 15/20 340/583 |
| 8,681,073 B1 | * | 3/2014 | Robbins .............. | H04N 21/4318 345/7 |
| 8,811,672 B2 | * | 8/2014 | Williams ................ | G06T 7/254 348/131 |
| 9,864,917 B1 | * | 1/2018 | Kronfeld ............ | G06K 9/00832 |
| 10,440,293 B1 | * | 10/2019 | Ihns ......................... | G06T 5/40 |

(Continued)

*Primary Examiner* — Tyler W. Sullivan
(74) *Attorney, Agent, or Firm* — Donna P. Suchy (57) ABSTRACT

Systems and methods for improving target object visibility in captured images can include an imaging sensor for mounting on an aircraft at a fixed position and orientation. A predetermined portion of the aircraft can appear as a region of interest (ROI) at a predefined location across images captured by the imaging sensor. A processor can receive a first image signal from the imaging sensor and corresponding to a first image that includes the ROI. The processor can determine a first image intensity range of the ROI in the first image and a gain value for modifying the first image or a subsequent image. The processor can cause a second image signal, received from the imaging sensor, to be amplified using the gain value and cause the region of interest in a second image to have a second image intensity range different from the first image intensity range.

20 Claims, 6 Drawing Sheets

(56) References Cited

U.S. PATENT DOCUMENTS

| | | | | |
|---|---|---|---|---|
| 2002/0159651 | A1* | 10/2002 | Tener | G06T 5/20 382/266 |
| 2005/0213849 | A1* | 9/2005 | Kreang-Arekul | G06T 3/4038 382/284 |
| 2006/0269155 | A1* | 11/2006 | Tener | G06T 3/4038 382/243 |
| 2008/0088719 | A1* | 4/2008 | Jacob | H04N 5/2256 348/241 |
| 2008/0310742 | A1* | 12/2008 | Kostrzewski | G06K 9/3233 382/236 |
| 2010/0231705 | A1* | 9/2010 | Yahav | G02B 27/01 348/115 |
| 2010/0310121 | A1* | 12/2010 | Stanfill | G06K 9/00201 382/103 |
| 2013/0200207 | A1* | 8/2013 | Pongratz | B64C 39/024 244/2 |
| 2014/0297068 | A1* | 10/2014 | Revell | G06K 9/00637 701/16 |
| 2014/0340570 | A1* | 11/2014 | Meyers | H04N 5/211 348/370 |
| 2014/0369598 | A1* | 12/2014 | Nilsson | G06T 5/50 382/162 |
| 2016/0178593 | A1* | 6/2016 | Miller | G06K 9/00791 382/191 |
| 2017/0270375 | A1* | 9/2017 | Grauer | G01S 17/107 |
| 2017/0315706 | A1* | 11/2017 | Helppi | G06F 3/04845 |
| 2017/0358103 | A1* | 12/2017 | Shao | G01S 3/00 |
| 2018/0053063 | A1* | 2/2018 | Shemesh | G01W 1/08 |
| 2019/0227575 | A1* | 7/2019 | Maor | G08G 5/0069 |

* cited by examiner

ENHANCING IMAGE QUALITY BASED ON CHARACTERISTICS OF A REFERENCE REGION OF INTEREST

RELATED APPLICATIONS

This application claims priority from U.S. Provisional Application No. 62/473,258, filed on Mar. 17, 2017, and entitled "ENHANCING IMAGE QUALITY BASED ON CHARACTERISTICS OF A REFERENCE REGION OF INTEREST", which is incorporated herein by reference in its entirety.

BACKGROUND

Various imaging systems can be used to track or identify locations of target objects. For example, an aircraft can include one or more imaging systems (e.g., camera(s), sensors, antennas, etc.) to image and visualize objects, such as other aircraft, in its vicinity. The imaging systems play a substantial role to ensure safe navigation of the aircraft and to avoid deadly and costly accidents. In particular, the imaging systems can provide the flight crew with continuous visual information describing the surroundings of the aircraft.

The role that imaging systems deployed on aircrafts can play in providing valuable visual situational awareness data calls for consistently reliable quality of the images generated by such systems. Specifically, degradation in image quality, even temporarily during a flight, may deprive the flight crew from valuable information, especially at some critical moments of the flight. For instance, image blurriness, reduced contrast, relatively high luminance, or other image distortion factors can degrade user perception or visual recognition of some objects or regions within displayed images.

SUMMARY

In one aspect, the inventive concepts disclosed herein are directed to a system for improving image quality based on visual characteristics of a reference region of interest (ROI). The system can include an imaging sensor for mounting on an aircraft at a fixed position and orientation with respect to the aircraft. A predetermined portion of the aircraft can appear as a region of interest at a fixed location across images captured by the imaging sensor. The system can include a processor communicatively coupled to the imaging sensor. The processor can be configured to receive a first image signal captured by the imaging sensor. The first image signal can correspond to a first image that includes the ROI. The processor can determine a first image intensity range of the region of interest in the first image, and determine a gain value for modifying the first image or a subsequent image, based on the first image intensity range. The processor can cause a second image signal, received from the imaging sensor, to be amplified according to the determined gain value and cause the region of interest in a second image corresponding to the second image signal to have a second image intensity range different from the first image intensity range.

The system can further comprise an amplifier communicatively coupled to the imaging sensor. In causing the second image signal to be amplified according to the determined gain value, the processor can be configured to adjust a gain of the amplifier based on the determined gain value. Causing the second image signal to be amplified according to the determined gain value can include the processor amplifying pixel intensity values of the second image using the determined gain value. The first image can be a color image and determining the first image intensity range associated with the region of interest in the first image can include (1) obtaining a monochrome image using the first image, and (2) determining the first image intensity range based on the monochrome image.

The processor can be further configured to cause display of the second image on a display device of the aircraft. The processor can be further configured to identify a second region of interest in the second image corresponding to a second aircraft based on the second image intensity range. The imaging sensor can be configured to sense at least one of visible light, near infrared (IR) waves, shortwave IR waves, mid-wave IR waves, longwave IR waves, millimeter waves, ultraviolet waves. The second image intensity range can be equal to a maximum image intensity range supported by a display device of the aircraft.

The processor can be further configured to determine a midpoint of the first image intensity range of the region of interest in the first image, and determine an offset value based on the midpoint of the first image intensity range. The processor can shift the second image signal by the determined offset value such that a midpoint of the second image intensity range of the region of interest in the second image is different than the midpoint of the first image intensity range of the region of interest in the first image. The processor can be further configured to receive an input command to adjust the second gain value to a third gain value, and cause the second image signal or a third image signal subsequent in time to the second image signal to be amplified according to the third gain value.

In a further aspect, the inventive concepts disclosed herein are directed to a method of improving image quality based on visual characteristics of a reference region of interest (ROI). The method can include capturing images by an imaging sensor mounted on an aircraft at a fixed position and orientation with respect to the aircraft. A predetermined portion of the aircraft can appear as a region of interest at a fixed location across the images captured by the imaging sensor. The method can include a processor communicatively coupled to the imaging sensor receiving a first image signal captured by the imaging sensor. The first image signal can correspond to a first image that includes the region of interest. The method can include the processor determining a first image intensity range of the region of interest in the first image, and determining a gain value, based on the first image intensity range, for modifying the first image or a subsequent image. The method can include the processor causing a second image signal, received from the imaging sensor, to be amplified according to the determined gain value, and causing the region of interest in a second image corresponding to the second image signal to have a second image intensity range different from the first image intensity range.

Causing the second image signal to be amplified according to the determined gain value can include adjusting a gain of an amplifier coupled to the imaging sensor based on the determined gain value. Causing the second image signal to be amplified according to the determined gain value can include amplifying pixel intensity values of the second image using the determined gain value. The first image can be a color image and determining the first image intensity range of the region of interest in the first image can include obtaining a monochrome image using the first image, and determining the first image intensity range based on the monochrome image.

The method can further include the processor causing display of the second image on a display device of the aircraft. The method can further include identifying a second region of interest in the second image corresponding to a second aircraft based on the second image intensity range. The imaging sensor can be configured to sense at least one of visible light, near infrared (IR) waves, shortwave IR waves, mid-wave IR waves, longwave IR waves, millimeter waves, ultraviolet waves. The second image intensity range can be equal to a maximum image intensity range supported by a display device of the aircraft.

The method can include the processor determining a midpoint of the first image intensity range of the region of interest in the first image, and determining an offset value based on the midpoint of the first image intensity range. The method can include shifting the second image signal by the determined offset value such that a midpoint of the second image intensity range of the region of interest in the second image is different than the midpoint of the first image intensity range of the region of interest in the first image. The method can include receiving an input command to adjust the second gain value to a third gain value, and causing the second image signal or a third image signal subsequent in time to the second image signal to be amplified according to the third gain value.

In a further aspect, the inventive concepts disclosed herein are directed to a system for improving image quality based on visual characteristics of a reference region of interest (ROI). The system can include an imaging sensor positioned at a fixed position with respect to an object. A portion of the object can appear as a region of interest at one or more predefined locations across images captured by the imaging sensor. The system can include a processor communicatively coupled to the imaging sensor and configured to receive a first image signal captured by the imaging sensor. The first image signal can correspond to a first image that includes the region of interest. The processor can determine a first image parameter value for a first image parameter of the region of interest in the first image, and determine a second image parameter value based on the first image parameter value. The processor can cause the first image, or a subsequent image captured by the imaging sensor, to be displayed on a display device according to the second image parameter value instead of the first image parameter value.

BRIEF DESCRIPTION OF THE DRAWINGS

Embodiments of the inventive concepts disclosed herein will become more fully understood from the following detailed description, taken in conjunction with the accompanying drawings, wherein like reference numerals refer to like elements, in which.

The details of various embodiments of the methods and systems are set forth in the accompanying drawings and the description below.

DETAILED DESCRIPTION

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the diagrams provided in this disclosure, but should be construed in accordance with the language in the claims.

In various imaging applications, imaged scenes may change rapidly over time. For example, scenes captured by cameras or other imaging devices mounted on moving ground vehicles, aircraft, or drones can change rapidly over time. Also, fixed cameras or imaging devices arranged to capture a rapidly time-varying environment, such as a portion of a highway where various vehicles rapidly enter and exit the field of view (FOV), can produce rapidly varying visual content. Cameras and imaging devices can be configured to adapt to scene change by adjusting respective settings. A camera can automatically change a respective gain, a respective offset value, a respective color map, or a respective color gamut based on, for example, the brightness or luminance range, color range, contrast, or sharpness of a captured image or scene. A camera may also automatically adjust an offset value, by which pixel intensity values or imaging signals are shifted, based on a measured average intensity or a measured average luminance of a captured image or scene. However, while adjusting camera settings based on visual content characteristics of the entire captured image or scene may improve the overall image quality, such adjustment may blur or obscure some regions of interest (ROIs) within the captured image. In particular, changes in the offset or gain may result in pixel intensity clipping, intensity range shrinking, contrast range shrinking, or color saturation at some regions of the captured image. As a result, user perception or visual recognition of such regions may be substantially degraded.

Users of imaging systems (or sensor imagery observers) desire consistent, repeatable scene quality to allow for easy and reliable image interpretation. However, scene geometry variation, dynamic motion (e.g., imaging system motion or motion within the captured environment), and dynamic scene luminance range can contribute to inconsistent image quality and degraded user perception. Changes in the view angle or scene content can result in substantial changes in the scene (or image) luminance, for example, as regions associated with sunlight (or other light sources), shade, darkness, clouds, or clear sky become part of (or exit) the field of view (FOV) of the imaging sensor capturing the scene. Also, motion of the imaging sensor with respect to the imaged scene(s) (or motion of objects within the scene(s) with respect to the imaging sensor) can result in substantial changes in visual scene content (e.g., scene luminance) over time. The change in the visual content over time can drive the gain and offset control of the imaging sensor to drastically different settings depending, for example, on bright or dark objects (or regions) that appear in, or disappear from, the FOV of the imaging sensor.

In many applications, the location of a region of interest or a target object to be tracked can be unknown or changing over time within the captured scene(s). For example, in the case of aircraft, imaging systems mounted on a first aircraft can be used to detect or track other aircraft that may come into the vicinity of the first aircraft. For example, during an aerial refueling process, pilots of a refuel aircraft (or tanker) can monitor or track the relative location of another aircraft (or receiver aircraft) to which aviation fuel is transferred using images captured by one or more imaging sensors and displayed in real time (e.g., within fractions of a second from time of capture). During the refueling process, the position of the receiver aircraft can change over time with respect to the position of the tanker or the position(s) of the imaging sensor(s). As such, assuming a fixed position of the receiver aircraft with respect to the refuel aircraft may lead to losing track of the receiver aircraft in the captured images and potentially extremely dangerous and costly accidents.

Because the target object size and position within captured scenes or images may not be consistently known, the imaging sensor(s) (or imaging system(s)) cannot easily and reliably key on the target object to optimize the dynamic range of the captured scenes based on visual characteristics (e.g., color range, brightness or luminance range, contrast, sharpness, etc.) of the target of interest. For example, during the refueling process, the position of the receiver aircraft within captured scenes can change and may not be known to the tanker. Absent information about the position of the target object within a captured scene, the imaging sensor(s) or the imaging system(s) can adapt respective settings (e.g., gain, offset, or color map) based on the characteristics of the entire scene rather than the characteristics of the target object. Such adaptation can lead sometimes to obscuring or blurring the target object within the captured scene. For instance, the receiver aircraft can be obscured in images captured by imaging sensors of the tanker, therefore, making the aerial refueling process very risky and dangerous. As an example, when using an imaging sensor to sense visible light, near infrared (IR) waves, or shortwave IR waves, a scene including a bright sky and dark ground can drive the dynamic intensity range (e.g., color range or luminance range) of the imaging sensor to be very wide overall, and can cause the details of the target object to be lost due to quantization of luminance or color values associated with the target object in the captured scene using only few quantization levels. Due to such quantization of luminance or color values, the target object can be lost or obscured in the scene clutter even though there may be sufficient contrast to detect the target object if the dynamic range was properly allocated. In the case of imaging sensors configured to sense midwave or longwave IR waves, similar effects can be seen in respective captured images except that hot and cold objects drive the dynamic range of the scene rather than light intensity. Also, similar effects can be seen in images captured by imaging sensors configured to sense millimeter waves, except that reflection or emission from various objects in the scene affect the dynamic range of the scene. Similar effects can also be seen in images captured by radar systems (or antennas) or x-ray imaging systems.

To overcome the technical problems discussed above, systems and methods described herein allow for adapting settings of imaging sensors (or adapting captured images) based on visual or image characteristics of a stationary reference region of interest (ROI) within captured images. The reference ROI can have a fixed location across images captured by the imaging sensor (or imaging system). Also, the reference ROI may also have similar visual (or image) characteristics as the target object. For example, the reference ROI can have substantially similar color range, substantially similar pixel intensity range, or substantially similar average pixel intensity as the target object (e.g., similarity predefined tolerance margins such as up to 10%, 5%, 2%, or 1% difference). In some instances, the visual (or image) characteristics of the reference ROI may be distinct from those of the target object, however, the difference between the visual (or image) characteristics of the reference ROI and those of the target object may be known a-priori. The imaging system can adapt the imaging sensor settings (or adapt captured images) based on the image characteristics of the reference ROI, for example, in each captured image rather than based on the visual characteristics of the entire image. This adaptation approach leads to improved user perception (or visibility) of the target object within the captured images or scenes.

According to at least one aspect of the current disclosure, a system (e.g., an imaging system) can include an imaging sensor for mounting on an aircraft at a fixed position and orientation with respect to the aircraft. A predetermined portion of the aircraft can appear as a region of interest at a fixed location across images captured by the imaging sensor. The system can include a processor that is communicatively coupled to the imaging sensor. The processor can receive a first image signal captured by the imaging sensor. The first image signal can correspond to a first image that includes the region of interest. The processor can determine a first image intensity range of the region of interest in the first image, and determine a gain value for modifying the first image or a subsequent image based on the first image intensity range. The processor can cause a second image signal, (e.g., equal to the first image signal or a subsequent image signal) received from the imaging sensor, to be amplified according to the determined gain value, and cause the region of interest in a second image corresponding to the second image signal to have a second image intensity range different from the first image intensity range.

According to another aspect of the current disclosure, a method can include an imaging sensor, mounted on an aircraft at a fixed position and orientation with respect to the aircraft, capturing images. A predetermined portion of the aircraft can appear as a region of interest at a fixed location across the images captured by the imaging sensor. The method can include a processor communicatively coupled to the imaging sensor receiving a first image signal captured by the imaging sensor. The first image signal can correspond to a first image that includes the region of interest. The method can include the processor determining a first image intensity range of the region of interest in the first image, and determining a gain value for modifying the first image or a subsequent image based on the first image intensity range. The method can also include the processor causing a second image signal, received from the imaging sensor, to be amplified according to the determined gain value, and causing the region of interest in a second image corresponding to the second image signal to have a second image intensity range different from the first image intensity range.

According to another aspect of the current disclosure, a system (e.g., an imaging system) can include an imaging sensor positioned at a fixed position and orientation with respect to an object. A predetermined portion of the object can appear as a region of interest at a fixed location across images captured by the imaging sensor. The system can include a processor that is communicatively coupled to the imaging sensor. The processor can receive a first image signal captured by the imaging sensor. The first image signal can correspond to a first image that includes the region of interest. The processor can determine a first image parameter value for a first image parameter of the region of interest in the first image, and determine a second image parameter value based on the first image parameter value. The processor can cause the first image, or a subsequent image captured by the imaging sensor, to be displayed on a display device according to the second image parameter value instead of the first image parameter value.

While embodiments described herein relate mainly to an imaging applications specific to aircraft, the systems, devices, methods, and software applications described herein can be employed in various other imaging applications. In general, an imaging sensor can be positioned at a position and orientation with respect to an object in a way that a reference region of interest representative of the object has known location(s) across images captured by the imaging sensor. For example, in the case of a ground radar system (or other ground imaging system), the object can be a water tower, a wireless base station, or other object within the FOV of the radar system. In such a case, the radar system (or the imaging system) may or may not be fixed with respect to the object. For example, the radar system may be configured to rotate. However, as the radar system rotates while the object is fixed, the locations of the reference ROI corresponding to the object across images generated by the radar system can be known (or identified) based on, for example, on the orientation of the radar system at each time instance.

Given known positions of the reference ROI across images captured by an imaging system, the imaging system can determine one or more visual characteristics (e.g., color range, average color value(s), luminance range, average luminance, sharpness, contrast, or a combination thereof) of the reference ROI to adjust one or more settings, such as gain or offset value, of the imaging system. Alternatively, the imaging system or a processor may adjust pixel intensity values of one or more captured images based on the determined visual characteristics of the reference ROI. The adjustment of imaging system settings or captured images based on visual characteristics of a reference ROI having known location(s) within the captured images can also be employed in imaging applications involving IR imaging systems or other imaging systems.

Figure 1A:
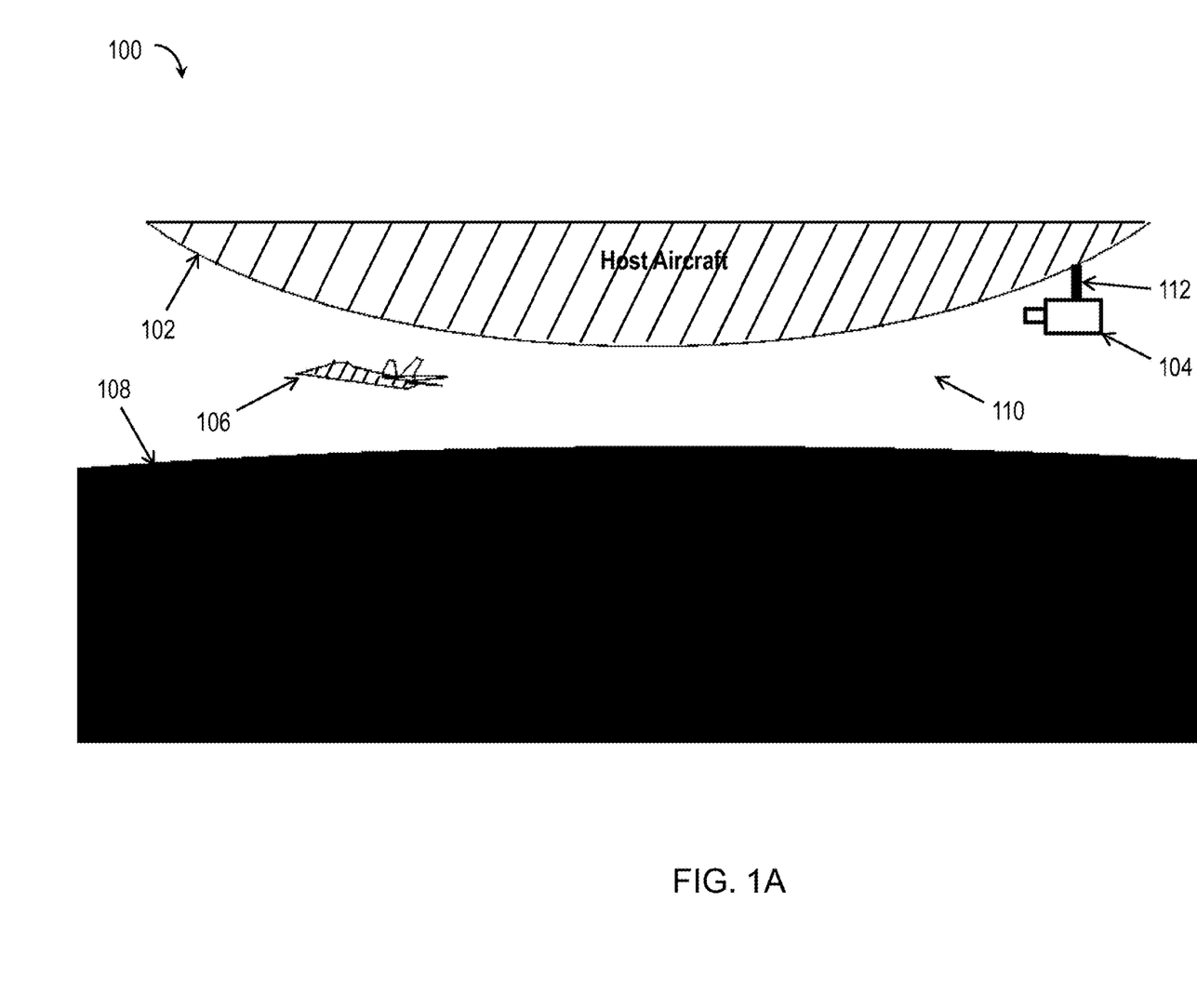
FIG. 1A shows a diagram illustrating an environment where an aircraft employs an imaging system in accordance with some embodiments of the inventive concepts of this disclosure.

FIG. 1A shows a diagram illustrating an environment 100 where an aircraft employs an imaging system in accordance with some embodiments of the inventive concepts of this disclosure. The environment 100 can include a host aircraft 102 with an imaging sensor 104 mounted on (or integrated within) the host aircraft 102, a target aircraft 106, the earth (or ground) 108 and the sky 110. Portions of the host aircraft 102, the target aircraft 106, the ground 108 and the sky can appear in the field of view (FOV) of the imaging sensor 104 depending, for example, on the position and orientation of the host aircraft 102 or the imaging sensor 104 and the position of the target aircraft 106. The imaging system may further include a bracket 112.

Figure 1B:
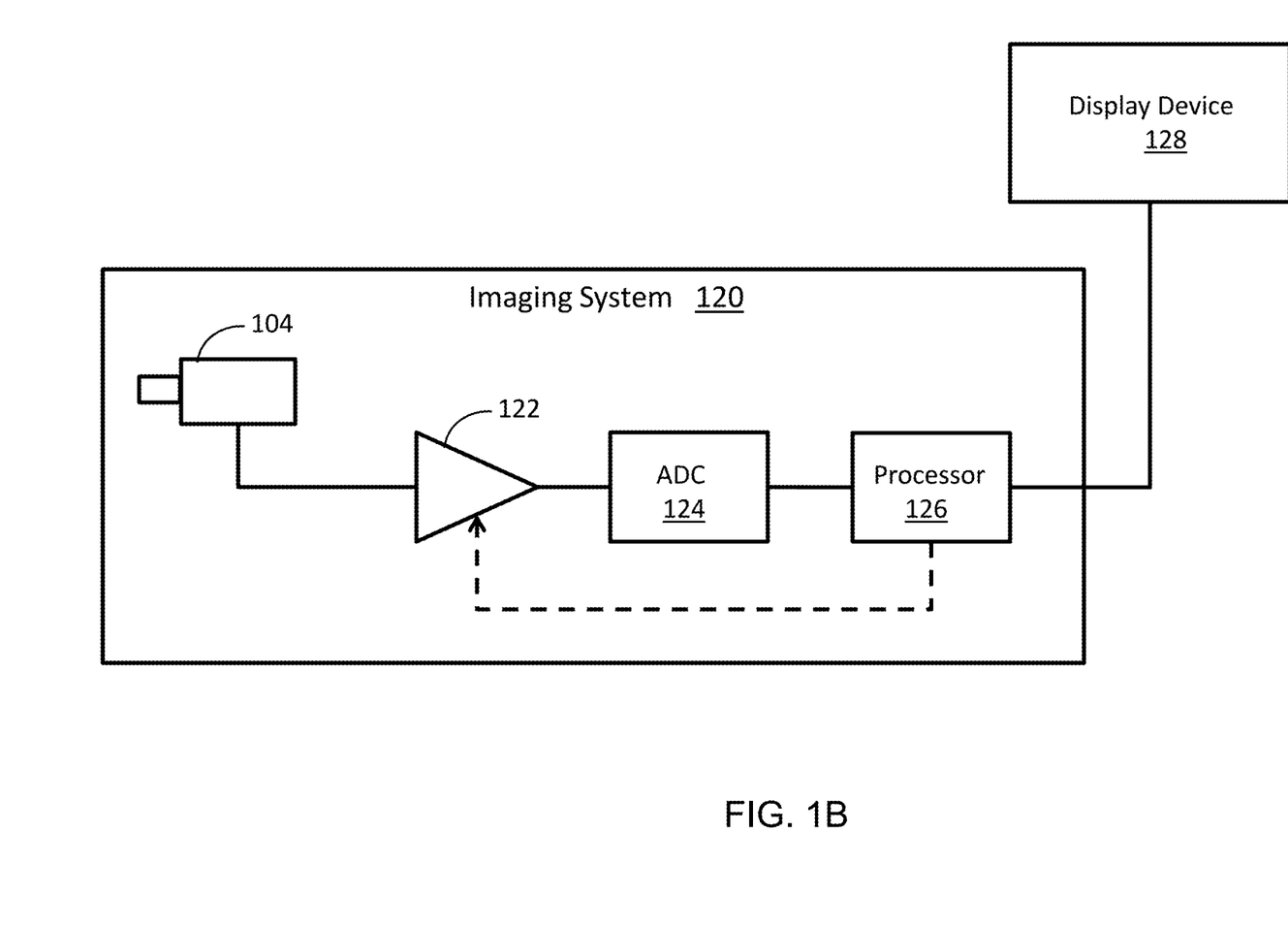
FIG. 1B shows a block diagram illustrating an imaging system in accordance with some embodiments of the inventive concepts of this disclosure.

The host aircraft 102 hosts an imaging system that can include the imaging sensor 104. FIG. 1B shows a block diagram illustrating an imaging system 120 in accordance with some embodiments of the inventive concepts of this disclosure. The imaging system 120 can also include a gain amplifier 122, an analog to digital converter (ADC) 124, and a processor 126. The imaging system 120 may also include a memory, a communication interface, or a combination thereof (not shown in FIG. 1B). The host aircraft 102 can also include, or be coupled to, a display device 128 for displaying images captured by the imaging sensor 104. The display device 128 may be part of, or coupled to, the imaging system 120. The imaging sensor 104 and any combination of the gain amplifier 122, the ADC 124, the processor 126, the memory, and the communication interface may be integrated in a single device (e.g., a camera) or may be distributed over multiple electronic devices. The imaging sensor 104 can be mechanically coupled to (e.g., mounted on or integrated in) the host aircraft 102 via a bracket 112 or other mechanical coupling mechanism(s). The imaging sensor 104 can be positioned according to a fixed location with respect to the host aircraft 102 such that a predetermined portion of the host aircraft appears as a region of interest having a fixed location across images captured by the imaging sensor 104. The imaging sensor 104 may also be positioned according to a fixed orientation (or view angle) with respect to the host aircraft 102.

In some instances, the imaging sensor 104 may be configured to rotate along an axis (e.g., an axis associated with the bracket 112) to change the orientation or view angle of the imaging sensor. In such instances, the rotation of the imaging sensor 104 may not affect the position, size or boundary of the image region corresponding to the host aircraft 102 across images captured by the imaging sensor 104. In other words, as the imaging sensor rotates, the image region corresponding to the host aircraft 102 stays the same across captured images. Alternatively, the image region corresponding to the host aircraft 102 may change as the imaging sensor 104 rotates. In such case, the position, size, boundary, or set pixels of the image region corresponding to the host aircraft 102 may be known to the imaging system 120 for each orientation angle of the imaging sensor.

Figure 2A:
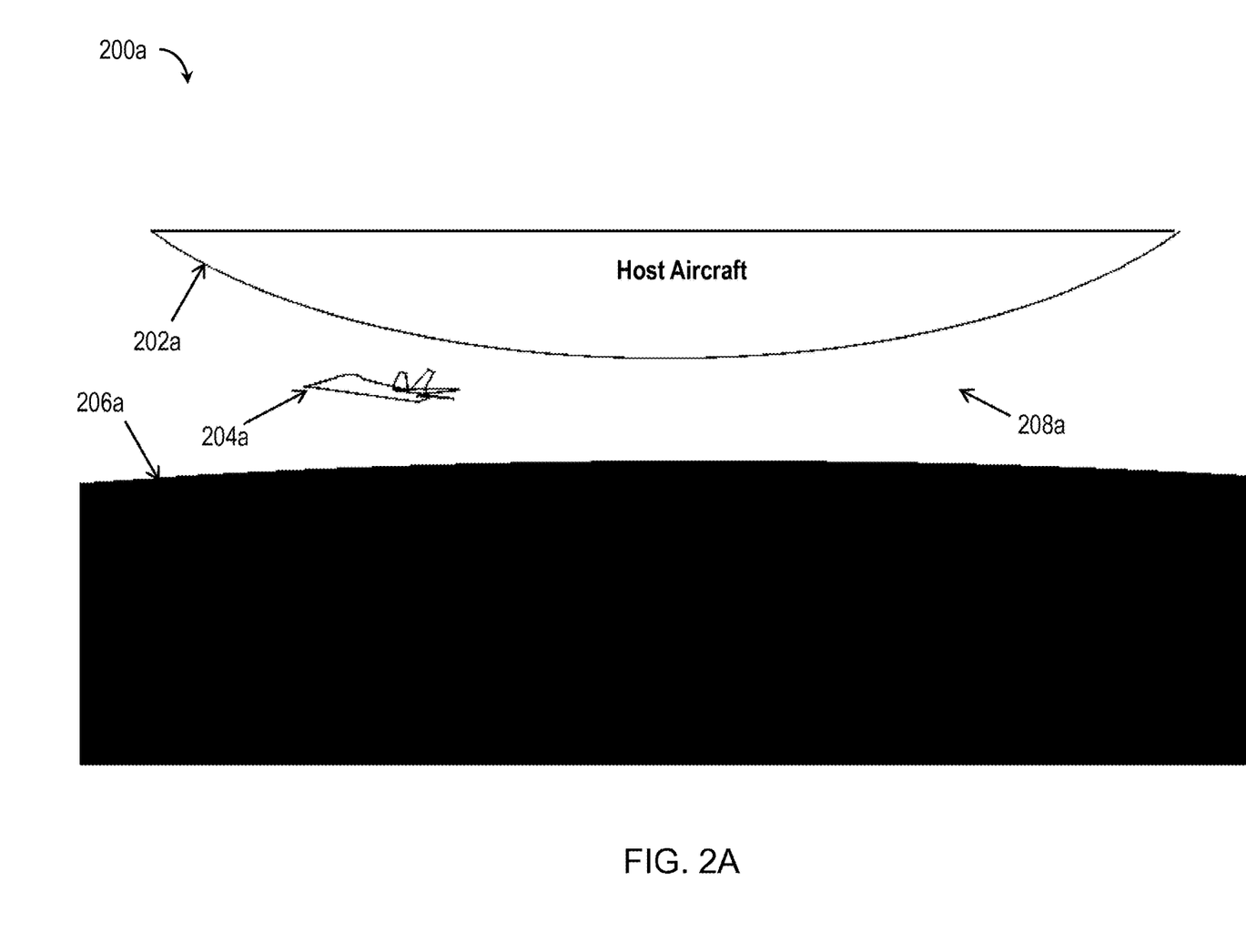
FIG. 2A shows a diagram illustrating a picture captured by the imaging system of FIG. 1B with gain and offset value set based on characteristics of visual content of entire image, in accordance with some embodiments of the inventive concepts of this disclosure.
Figure 2B:
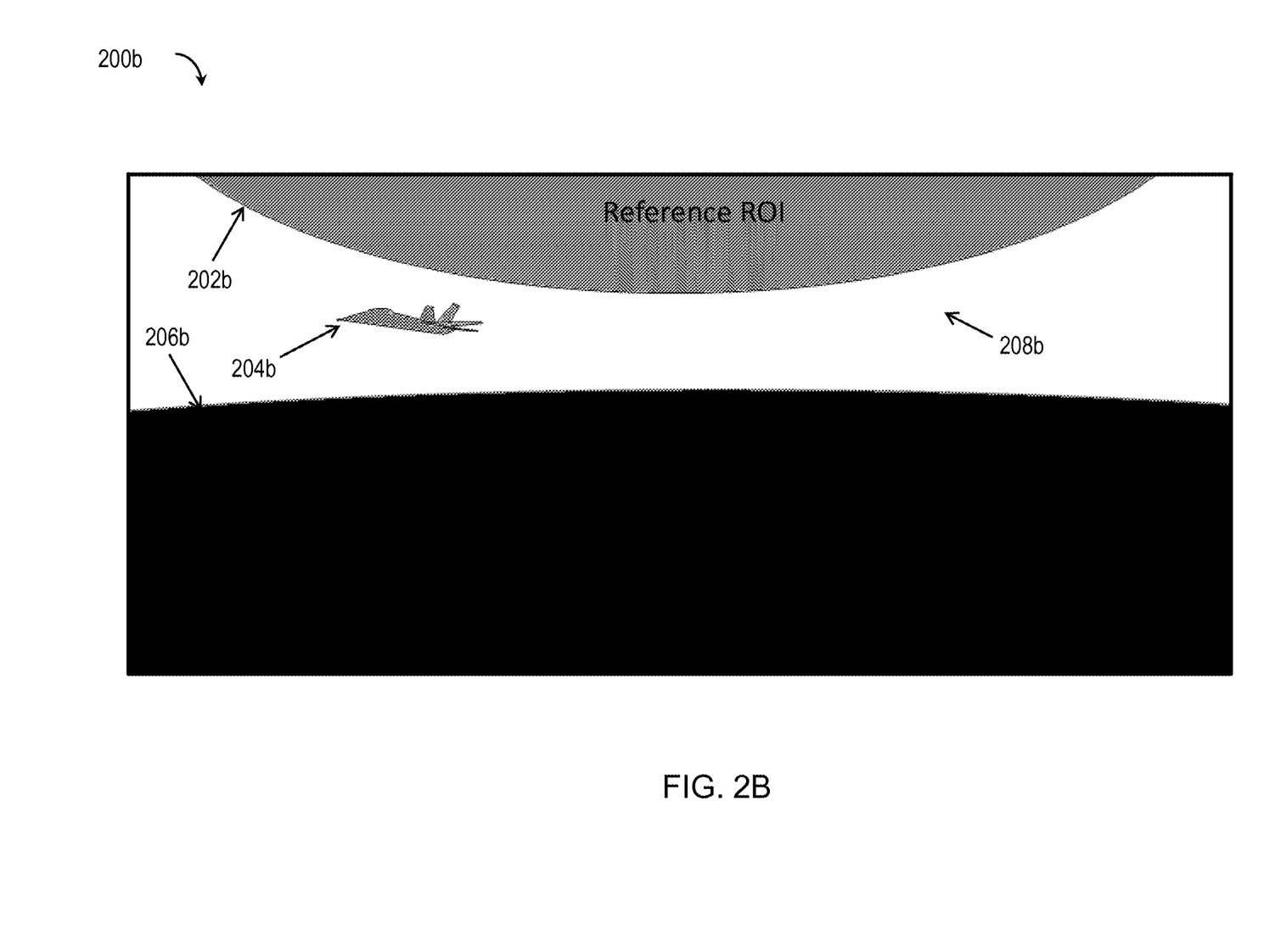
FIG. 2B shows a diagram illustrating a picture captured by the imaging system of FIG. 1B with gain and offset value set based on characteristics of visual content associated with a target object, in accordance with some embodiments of the inventive concepts of this disclosure.

FIG. 2A shows an example image 200a captured by the imaging system 120 of FIG. 1B with gain and offset values set based on characteristics of visual content of entire image, in accordance with some embodiments of the inventive concepts of this disclosure. FIG. 2B shows a diagram illustrating an image 200b captured by the imaging system 120 of FIG. 1B with gain and offset value set based on characteristics of visual content associated with a target object, in accordance with some embodiments of the inventive concepts of this disclosure. The images 200a and 200b (also referred to individually or in combination as image(s) 200) each can include a reference region of interest (ROI) 202a or 202b (also referred to as reference ROI(s) 202) corresponding to a portion of the host aircraft 102, a target object 204a or 204b (also referred to as target object(s) 204) corresponding to at least a portion of the target aircraft 106, a first image region 206a or 206b (also referred to as image region(s) 206) corresponding to the ground 108, and a second image region 208a or 208b (also referred to as image region(s) 208) representative of the sky 110. The reference ROI 202 and the target object 204 can have substantially similar visual characteristics, such as color, luminance, contrast, or sharpness, as a result of structural or appearance similarities (e.g., similarities in color or in building material) between the host aircraft 102 and the target aircraft 106. For example, the luminance (or the color) of the reference ROI 202 and that of the target object 204 can be similar within 5%, 2%, 1%, or other error margin.

The reference ROI 202 can have a substantially fixed location, substantially fixed size, or substantially fixed boundary across various images captured by the imaging sensor 104. For instance, the location, the size or the boundary of the reference ROI 202 may vary by plus or minus a few pixels (e.g., compared to the total pixels of the reference ROI 202) from one image frame to another (e.g., due to vibration or rotation of the imaging sensor with respect to the host aircraft 102). The reference ROI 202 can have substantially similar image characteristics (e.g., average luminance or pixel intensity, luminance or pixel intensity range, or color range) as the target object 204 in images captured by the imaging system 120. For example, the host aircraft 102 and the target aircraft 106 can have substantially similar color resulting in substantially similar image characteristics between the reference ROI 202 and the target object 204 in images 200 captured, for example, by an imaging sensor configured to sense visible light, near IR waves or shortwave IR waves. The surfaces of the host aircraft 102 and the target aircraft 106 may be made of the similar materials (e.g., with respect to heat characteristics) and subjected to substantially similar outside temperatures resulting in substantially similar image characteristics between the reference ROI 202 and the target object 204 in images 200 captured, for example, by an imaging sensor configured to sense midwave or longwave IR waves. The reference ROI 202 and the target object 204 may have substantially similar image characteristics in images 200 captured using millimeter wave based imaging systems, radar systems, or other imaging systems.

The processor 126 can receive, from the imaging sensor 104, an image signal (e.g., corresponding to the image 200) captured by the imaging sensor 104. The imaging sensor 104 may record an analog signal representative of the captured scene. The analog-to-digital converter (ADC) 124 coupled to the imaging sensor 104 may convert the recorded analog signal to a corresponding digital signal and provide the generated digital signal to the processor 126. A gain amplifier, communicatively coupled to the imaging sensor 104, may amplify the recorded analog signal, and provide the amplified signal to the ADC 124.

The imaging system 120 can generate the image 200a (shown in FIG. 2A) using settings (e.g., gain or offset value(s)) determined based on characteristics of the visual content of an entire image captured by the imaging sensor. For instance, a processor 126 of the imaging system 120 can analyze an entire image (e.g., a non-processed version of the image 200a or an image preceding the image 200a in a sequence of captured images) to determine the color range or the luminance range within the analyzed image. The processor 126 can determine a gain and/or an offset value to be used to adjust pixel intensities of the analyzed image or a subsequent image. The processor 126 may determine the gain and/or the offset value so that the determined luminance range (or color range) spans a pixel intensity range supported by the imaging system 120 or the display device 128 of the host aircraft 102. For example, if the analyzed image has a luminance range extending between luminance intensity values 69 and 132, the processor 126 can use an offset value equal to −69 to shift the luminance range to the left to occupy the interval [0, 63] and a gain value equal to 255/63 to amplify the shifted luminance range by the gain value, and, therefore generate an output image (e.g., image 200a) with an output luminance range extending between 0 to 255. The net offset (or shift) between the center of the initial pixel intensity range [69, 132] of the reference ROI and the center of the final pixel intensity range [0,255] is 27.

Using the luminance range (or color range) of the entire analyzed image may result in low-quality visibility of the target object 204a within the output image (e.g., image 200a). For example, in the image 200a, the contrast between the target object 204a and the image region 208a representing the sky 110 may be substantially smaller than the luminance range (or color range) of the entire analyzed image. As a result, the target object 204a (and the reference ROI 202) may not be visually recognizable (or distinguishable) from the image region 208a corresponding to the sky 110 within the output image (e.g., image 200a) generated based on gain and/or offset value determined using the luminance/color image of the entire analyzed image.

The problem illustrated in FIG. 2A can be addressed by allowing manual adjustment of the gain and/or offset, for example, at the display device 128. However, during an aerial refueling process the crew of the host aircraft usually have their hands full working to maintain a steady position of the host aircraft 102 with respect to the target aircraft 106. In such situation, manually adjusting the gain and/or the offset at the display device 128 each time the visibility of the target object 204 is degraded may be dangerous and non-practical. In some embodiments, the imaging system 120 can automatically adjust the gain and/or the offset using visual characteristic of to the reference ROI instead visual characteristics of the entire image.

To generate the image 200b (shown in FIG. 2B), the processor 126 can analyze an image captured by the imaging sensor 104, for example, to determine an image intensity range (or other image parameter(s)) of the reference ROI 202b. For instance, the processor 126 can identify a set of pixels forming the reference ROI 202b (or a subset thereof), and determine one or more image parameters (e.g., pixel intensity range, average pixel intensity, color range, luminance range, color or pixel intensity histogram(s), or a combination thereof) of the identified set of pixels. The determined image parameter(s) can provide an insight regarding pixel intensity distribution or contrast within the reference ROI 202b.

The processor 126 can determine a gain value (or pixel intensity mapping) for modifying the analyzed image or a subsequent image to achieve a target pixel intensity range (e.g., color range or luminance range) for the reference ROI 202b. The processor 126 may determine the gain value, for example, by dividing the length of a target pixel intensity range by the length of the determined pixel intensity range (e.g., color range or luminance range). For example, if the length of the pixel intensity range of the reference ROI 202b in the analyzed image is equal to 16 (e.g., the pixel intensity range can extend from 120 to 135 or from 145 to 160) and the length of the target pixel intensity range is 128, the processor 126 can determine the gain to be equal to 8. The target pixel intensity range can represent a desired pixel intensity range for the reference ROI 202b or the target object 204b in an output image (e.g., image 200b) to be displayed on the display device 128 of the host aircraft 102.

The target pixel intensity range for the reference ROI may be equal to a maximum pixel intensity range (e.g., 0-255 for 8-bit monochrome system) supported by the imaging system 120 or the display device 128 of the host aircraft 102. In some instances, the target pixel intensity range may be smaller than the maximum pixel intensity range supported by the imaging system 120 or a display device 128 of the host aircraft, such as a target pixel intensity range (for the reference ROI 202*b*) with length equal to 32, 64, 128, 256, or some other interval.

The processor 126 can cause a second image signal, (e.g., equal to the image signal corresponding to the captured and analyzed image or a subsequent image signal) received from the imaging sensor, to be amplified according to the determined gain value and/or cause the pixel intensity range (e.g., color range or luminance range) of the reference ROI 202*b* in an output image (e.g., image 200*b*) corresponding to the second image signal to be equal to the target pixel intensity range. For example, the processor 126 may adjust a gain of the amplifier (coupled to the imaging sensor 104) based on the determined gain value. The processor 126 may amplify pixel intensity values (e.g., in the digital domain) of the captured and analyzed image or a subsequent image using the determined gain value. Considering that the reference ROI 202*b* and the target object 204 have similar visual characteristics (e.g., substantially similar color range or luminance range), amplifying the captured image (or the subsequent image) by the determined gain can improves the pixel intensity range of the reference ROI 202*b* and that of the target objet 204.

The processor 126 may determine an offset value to shift the determined pixel intensity range of the reference ROI in the captured image (or a subsequent image). For example, the processor 126 may cause the final pixel intensity range of the reference ROI 202*b* within the output image (e.g., image 200*b*) to be centered at middle of the maximum pixel intensity range (e.g. 127.5 for a maximum pixel intensity range equal to [0,255]) supported by the display device 128 of the host aircraft 102. For example, if the initial pixel intensity range of the reference ROI 202*b* (within the captured and analyzed image) is equal to [145,160], the processor 126 can shift pixel intensities of (or a an image signal corresponding to) the captured image or a subsequent image by −25, for example, to center the shifted pixel intensity range of the reference ROI 202 at 127.5. The processor 126 can apply the gain to the shifted image by amplifying, for each pixel, a respective pixel intensity distance (or difference) from the center of the shifted range (e.g., distance from 127.5) by the determined gain. A person skilled in the art would appreciate that the shifting and amplification operations could be performed in various different ways.

Comparing the images 200*a* and 200*b* shown respectively in FIGS. 2A and 2B, one can see that determining the gain and/or offset based on visual characteristics of reference ROI 202, instead of the visual characteristics of an entire captured image, leads to improved visibility of the target object 204*b* compared to target object 204*a*. For example, while the target object 204*a* in image 200*a* seems to blend in, and appear indistinguishable from, the image region 208*a*, the target object 204*b* in the image 200*b* is visually recognizable and distinguishable from the image region 208*b* corresponding to the sky 110.

Figure 3:
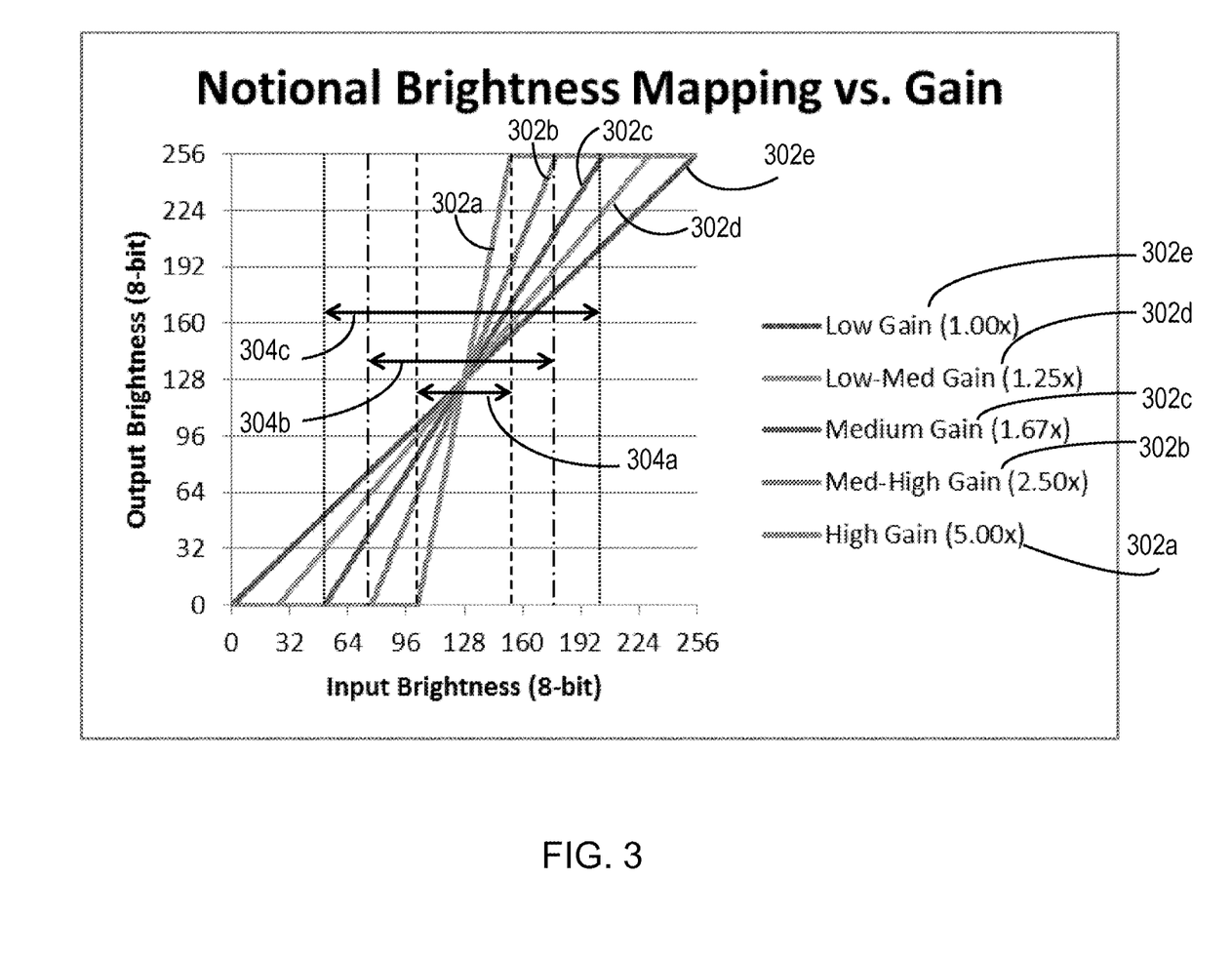
FIG. 3 is a diagram illustrating various plots representing changes in pixel intensities responsive to applying various gain values by the imaging system, in accordance with some embodiments of the inventive concepts of the current disclosure.

FIG. 3 shows a diagram illustrating various plots representing mappings of pixel intensities responsive to applying various gain values by the imaging system 120, in accordance with some embodiments of the inventive concepts of the current disclosure. The plots 302*a*-302*e* can represent mappings of pixel intensities corresponding to the gain values 5.00, 2.50, 1.67, 1.25, and 1.00, respectively. While the processor 126 can apply the pixel intensity mappings (e.g., illustrated by the plots 302*a*-302*e*) to all pixels in a captured image (e.g., image 200 or a subsequent image), the pixel intensity range of the reference ROI 202 changes from an original pixel intensity range (e.g., original pixel intensity range 304*a*, 304*b*, or 304*c* corresponding to plots 302*a*, 302*b*, or 302*c*, respectively). Pixels intensities outside the reference ROI 202 may experience clipping (e.g., clipped to 0 or to 255) during the mapping process. By modifying a captured image to increase (or improve) the pixel intensity range of the reference ROI 202, the processor 126 can also improve (or increase) the pixel intensity range of the target object 204 since the target object has substantially similar image characteristics as the reference ROI 202. Accordingly, the image signal amplification process (or pixel intensity mapping process) leads to enhanced user perception of the target object 204 even as the captured scene undergoes rapid or substantial variations (e.g., scene variations due to clouds, rain, exposure to sunlight, change of FOV due to, for example, changes in the orientation of the host aircraft) over time.

The processor 126 may also determine a first average pixel intensity (or a midpoint of the determined pixel intensity range) of the reference ROI 202 in the captured image 200, and determine a pixel intensity offset value based on the determined average pixel intensity. For example, if the original intensity range 304*a* is not centered at 128 (e.g., midpoint of the target pixel intensity range). The processor 126 may compute a difference between, for example, the midpoint of the target pixel intensity range and the midpoint of the original pixel intensity range 304*a* as the pixel intensity offset value. The processor 126 can then shift the pixel intensity values (or the captured image 200 or a subsequent image) or shift a subsequent image signal by the computed pixel intensity offset value before applying amplification or pixel intensity mapping based on the determined gain value.

The processor 126 can then cause the image resulting from the amplification (or enhancement) process to be displayed on a display device 128 of the aircraft 102. The processor 126 may provide pixel intensity values of the modified image to the display device 128 for display to a user. The processor 126 may identify the target object 204 (e.g., on a screen of the display device) within the modified image based on the image intensity range (or other image characteristics) of the reference ROI 202 within the modified image. The processor 126 may cause an indicator of the target object 204 (e.g., a rectangle or circle around the target object 204, a cursor overlapping or touching the target object, or transparent mask overlapping with the target object 304) to be displayed on the display device 128.

The processor 126 may be configured to receive an input command to adjust the determined gain value, for example, responsive to causing display of the modified image. For example, a user of the imaging system 120 may initiate such command through a gain tuning button or through an input device coupled to or associated with the imaging system 120. In response, the processor 126 can cause a change in the determined gain value or a corresponding mapping (such as a pixel intensity mapping as illustrated by any of the plots 302*a*-302*e*) according to received command. The processor 126 can adjust the previously modified image or subsequently captured images based on a gain value indicated through the received command.

In the case where the captured image 200 is a color image, the processor 126 may obtain (or generate) a monochrome image using the captured image 200. For instance, the processor 126 may compute the luminance component Y (in the YUV color space) based on RGB components of the color image. The processor 126 may determine the image intensity range (or other image parameters) of the captured image 200 based on the obtained (or generated) monochrome image.

Embodiments described herein can be employed with various types of imaging sensors. For instance, the imaging sensor 104 can be capable of sensing visible light (such as a camera sensor), near infrared (IR) waves, shortwave IR waves, mid-wave IR waves, longwave IR waves, millimeter waves, or ultraviolet waves. Also, while embodiments herein are described with regard to an imaging system 120 associated with aircraft, these embodiments can be employed for imaging systems mounted on ground vehicles or stationary structures, radar systems, or other imaging systems.

Figure 4:
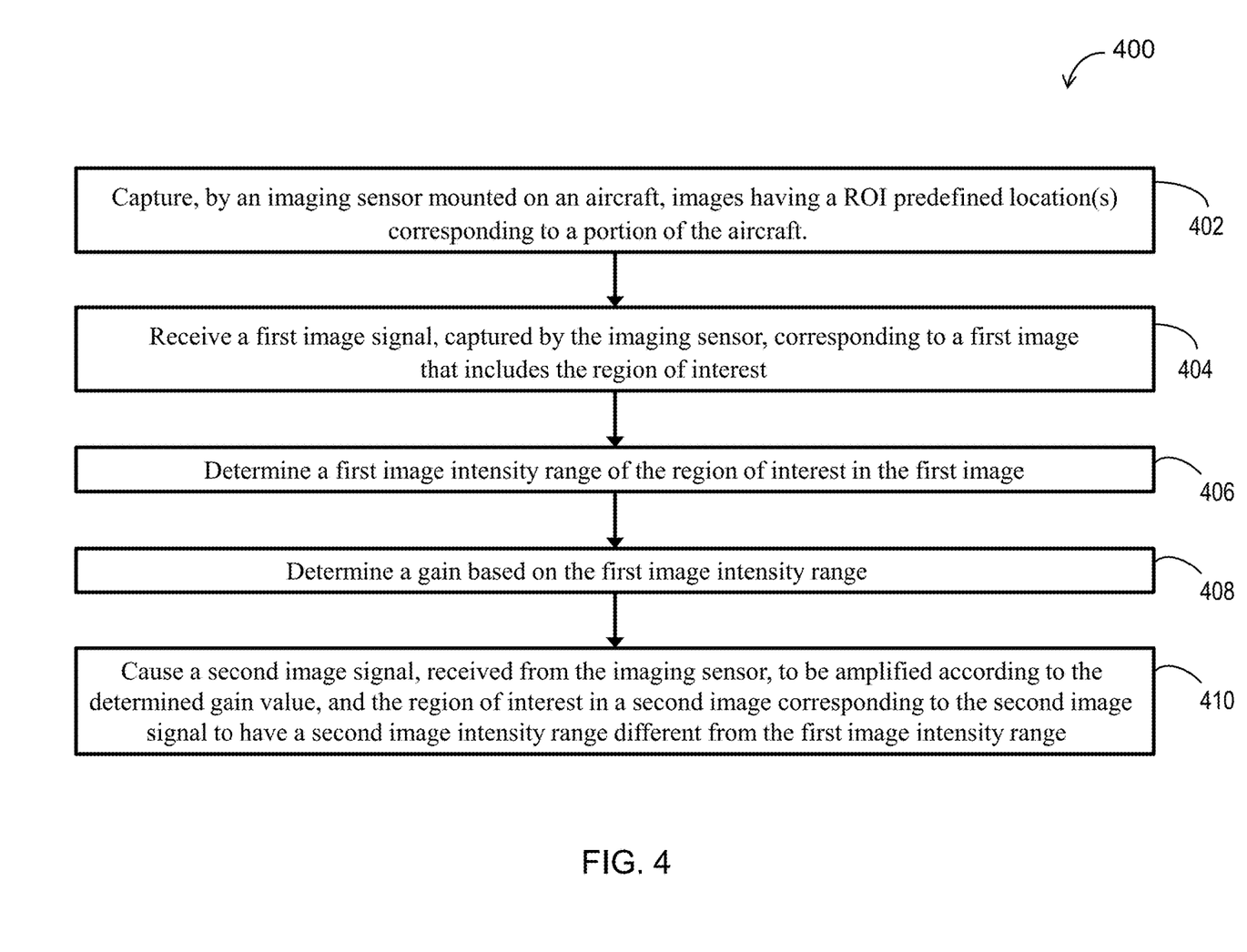
FIG. 4 is a flow diagram illustrating method 400 of enhancing image quality based on image characteristics of a reference region of interest, in accordance with some embodiments of the inventive concepts of the current disclosure.

FIG. 4 is a flow diagram illustrating method 400 of enhancing image quality based on image characteristics of a reference region of interest, in accordance with some embodiments of the inventive concepts of the current disclosure. The method 400 can include an imaging sensor, mounted on an aircraft, capturing images having a region of interest (ROI) corresponding to a portion of the aircraft at one or more predefined image locations (step 402). The method can include a processor 126, communicatively coupled to the imaging sensor, receiving a first image signal captured by the imaging sensor and corresponding to a first image that includes the ROI (step 404). The method can include the processor 126 determining a first image intensity range of the region of interest in the first image (step 406), and determining a gain value for modifying the first image or a subsequent image based on the first image intensity range (step 408). The method can also include the processor 126 causing a second image signal, received from the imaging sensor, to be amplified according to the determined gain value, and causing the region of interest in a second image corresponding to the second image signal to have a second image intensity range different from the first image intensity range (step 410). The method 400 can be performed by the imaging system 120 as described above with regard to FIGS. 1A-3.

The method can include the imaging sensor 104 capturing images having a region of interest (ROI) corresponding to a portion of the aircraft at one or more predefined image locations (step 402). The imaging sensor can automatically capture still images or video sequences. The imaging sensor can be configured to sense at least one of visible light, near infrared (IR) waves, shortwave IR waves, mid-wave IR waves, longwave IR waves, millimeter waves, ultraviolet waves. The imaging sensor 104 can be mounted to the aircraft 102 according to a fixed position and orientation with respect to the aircraft 102 such that an image ROI (such as ROI 202a or 202 b) representative of a portion of the aircraft 102 has a fixed location across images (or image frames) captured by the imaging sensor 104. The imaging sensor 104 may be mounted in a way to have a variable position or variable orientation with respect to the aircraft. For example, the imaging sensor can be configured to rotate along a predefined axis or slide along a predefined path. However, images captured as the imaging sensor 104 moves or changes orientation can still include an ROI representative of portion(s) of the aircraft 102. In each captured image, the ROI can have a predefined location, shape, and/or size (e.g., defined based on the position and orientation of the imaging sensor 104) within that image. For instance, the processor 126 may have access to the position and orientation of the imaging sensor at each time instance and to a data structure mapping storing for each location and/or orientation of imaging sensor to a corresponding location, size, and/or shape of the ROI in images captured while the imaging sensor is at that position and orientation.

The method can include the processor 126 receiving a first image signal captured by the imaging sensor and corresponding to a first image that includes the ROI (step 404). The imaging sensor 104 can capture an image and provide a corresponding image signal to the processor 126 for analysis and or presentation on the display device 128 of the aircraft 102. The analog-to-digital converter (ADC) 124 may convert the image signal to a corresponding digital image signal and provide the digital image signal to the processor 126. The digital image signal can be a monochrome image signal or a color (e.g., red, green and blue (RGB)) image signal.

The method can include the processor 126 determining a first image intensity range of the region of interest in the first image (step 406). The processor 126 can process the digital image signal by determining pixel intensities (also referred to as image intensities) for image pixels associated with the ROI (e.g., ROI 202), and determine a first pixel intensity range for the ROI 202 based on the determined pixel intensities. The pixels (or at least a subset thereof) forming the ROI 202 in the first image can be known to the processor 126, for example, based on the location and orientation of the imaging sensor 104 or due to the stationary nature of the ROI 202 across images captured by the imaging sensor. In the case where the first image is a color image, the processor 126 can determine the first image intensity range based pixel intensity values for at least one of the color components (e.g., R, G or B). For example, the determined first intensity range can be representative of the range of intensity for one of the color components (e.g., R, G, or B) within the ROI 202. The processor 126 may alternatively convert the color image to a corresponding monochrome image (e.g., a gray scale image), and determine the first image intensity range based on the monochrome image. In such case, the determined first intensity range can be representative of the range of gray scale pixel intensities within the ROI 202.

The method can include determining a gain value for modifying the first image or a subsequent image based on the first image intensity range (step 408). The gain value can be greater than one to increase the image intensity range within the ROI 202 and/or improve the contrast or the visibility of the ROI 202 with respect to rest of the first image. Improving the visibility of the ROI 202 in the first image can also improve the visibility of the target object 204. The processor 126 may determine the gain based on a desired or target pixel intensity range. For example, the processor 126 can divide the length of the desired pixel intensity range by the determined pixel intensity range to determine the gain. The desired or target image intensity range can be equal to the maximum image intensity range (e.g., 0 to 255) supported by the display device 128 of the aircraft 102 or the imaging system 120. The processor 126 may determine the gain based on a mapping that associates a gain value for each length of the determined pixel intensity range. The processor 126 may use a fixed value of the gain, such as 2, 3, 4, or other gain value.

The method can also include the processor 126 causing a second image signal, received from the imaging sensor, to be amplified according to the determined gain value, and causing the region of interest in a second image corresponding to the second image signal to have a second image intensity range different from the first image intensity range (step 410). The processor 126 can adjusting a gain of an amplifier coupled to the imaging sensor based on the determined gain value so that subsequently captured images (or image signals) are amplified based on the determined gain value. As such, the amplification of captured image signals can be applied to analog image signals. The processor 126 may amplify pixel intensity values of the first image or a subsequent image (e.g., in the digital domain) using the determined gain value. In some instances, the processor 126 may apply both, adjusting the gain of the amplifier and amplify pixel intensity of the first image or a subsequent image.

The processor 126 can further determine an offset value based on the determined first image intensity range, and shift the received image signal or pixel intensities within the first image (or a subsequent image) by the determined offset value. For example, the processor 126 can determine the offset value as the distance between the midpoint of the determined first image intensity range (of the ROI 202 in the first image and a midpoint of the desired or target pixel intensity range. The processor 126 can determine both midpoints and compute the offset value by subtracting the midpoint of the first pixel intensity range from the midpoint of the desired image intensity range. In some instances, the processor 126 may determine an average of the pixel intensity values of the ROI 202 in the first image, and determine the offset value as the difference between the midpoint of the desired image intensity range (or desired center value) and the determined average of the ROI pixel intensities within the ROI 202. The processor 126 can perform one or more shifting processes of the pixel intensities to achieve a net shift by the determined offset value (depending for example on how and when the shifting is applied).

The processor 126 can provide the modified image signal for presentation on the display device 128 of the aircraft 102. The processor 126 can also identify the target object 204 corresponding to the target aircraft 106 in the modified image based on the desired or target image intensity range. For example, the processor 126 can identify image regions having a respective image intensity range similar to the desired or target image intensity range to identify the target object 204. The processor 126 may cause the display device 128 of the aircraft 102 to further display an indicator (e.g., a transparent overlay, a cursor, or a contour around the target object 204) to indicate the location of the target object 204 in the displayed image. The display device 128 or imaging system 120 may provide an input interface to allow manual modification of the gain or offset value. The processor 126 may receive an input command, through the input interface, to adjust the gain and/or the offset in the displayed image or subsequent images. In response, the processor 126 can further adjust the displayed image or subsequently captured images based on the received based on the received command. The received command can include a new (or change) value of the gain or offset.

While the embodiments described above focus mainly on imaging systems and methods for use in aircraft, such systems and methods can be employed in other applications. Also, the adjustment of image quality may not necessarily be based on image intensity range only. In general, an imaging system can include an imaging sensor positioned at a fixed position with respect to a first object so that a portion of the first object can appear as a region of interest at one or more predefined locations across images captured by the imaging sensor. The system can also include a processor communicatively coupled to the imaging sensor and configured to receive a first image signal captured by the imaging sensor and corresponding to a first image that includes the region of interest. The processor can determine one or more first image parameter values for one or more first image parameters (e.g., image intensity range, an image intensity histogram, a contrast metric, a sharpness metric, or a combination thereof) of the ROI 202 in the first image. The processor can then determine one or more second image parameter values (e.g., a second image intensity range, a second image intensity histogram, a second contrast metric value, a second sharpness metric value, or a combination thereof). The processor may determine one or more second image parameter values to replace the one or more first image parameter values, and improve the visibility of the ROI 202 in the first image. The processor can then adjust the first image or a subsequent image according to the one or more second image parameter values, and cause the modified image to be displayed on a display device 128.

The processes described herein (e.g., with regard to FIGS. 1-4) can be implemented using software, hardware, firmware, or a combination thereof. For example computer code instructions can be executed by one or more processors to perform one or more of the processes described herein. The computer code instructions can be stored on a non-transitory computer-readable medium.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

What is claimed is:

1. A system comprising:
   an imaging sensor for mounting on an aircraft at a fixed position and orientation with respect to the aircraft, a predetermined portion of the aircraft appearing as a reference image region at a fixed location across images captured by the imaging sensor, the reference image region having visual characteristics known to the system; and
   a processor, communicatively coupled to the imaging sensor, configured to:
      receive a first image signal captured by the imaging sensor, the first image signal corresponding to a first image that includes the reference image region;
      determine a first image intensity range of the reference image region in the first image, the first image intensity range representing a range of pixel intensities of pixels associated with the reference image region in the first image signal;
      determine a gain value, based on the first image intensity range, for modifying the first image or a subsequent image; and cause a second image signal, received from the imaging sensor subsequent to the first image signal, to be amplified using the gain value, and to cause the reference image region in a second image corresponding to the second image signal to have a second image intensity range different from the first image intensity range, wherein responsive to a potential target image region corresponding to a second aircraft having a third image intensity range similar to the first image intensity range of the reference image region, amplifying the second image signal improves visibility of the second aircraft in the second image.

2. The system of claim 1, further comprising an amplifier communicatively coupled to the imaging sensor, wherein in causing the second image signal to be amplified using the gain value, the processor is configured to adjust a gain of the amplifier based on the gain value.

3. The system of claim 1, wherein causing the second image signal to be amplified using the gain value includes amplifying pixel intensity values of the second image using the gain value.

4. The system of claim 1, wherein the first image is a color image, and wherein determining the first image intensity range associated with the reference image region in the first image includes:
obtaining a monochrome image using the first image; and
determining the first image intensity range based on the monochrome image.

5. The system of claim 1, wherein the processor is further configured to cause display of the second image on a display device of the aircraft.

6. The system of claim 1, wherein the processor is further configured to identify the potential target image region corresponding to the second aircraft in the second image responsive to amplifying the second image signal.

7. The system of claim 1, wherein the processor is further configured to:
determine a midpoint of the first image intensity range;
determine an offset value based on the midpoint of the first image intensity range; and
shift the second image signal by the offset value such that a midpoint of the second image intensity range of the reference image region in the second image is different than the midpoint of the first image intensity range of the reference image region in the first image.

8. The system of claim 1, wherein the gain value is a first gain value and the processor is further configured to:
receive an input command to adjust the first gain value to a second gain value; and
cause the second image signal or a third image signal subsequent in time to the second image signal to be amplified using the second gain value.

9. The system of claim 1, wherein the imaging sensor is configured to sense at least one of:
visible light;
near infrared (IR) waves;
shortwave IR waves;
mid-wave IR waves;
longwave IR waves;
millimeter waves; or
ultraviolet waves.

10. The system of claim 1, wherein the second image intensity range is equal to a maximum image intensity range supported by a display device of the aircraft.

11. A system comprising:
an imaging sensor positioned at a fixed position and orientation with respect to a first object, a portion of the first object appearing as a reference image region one or more predefined locations across images captured by the imaging sensor, the reference image region having visual characteristics known to the system; and
a processor, communicatively coupled to the imaging sensor, configured to:
receive a first image signal captured by the imaging sensor, the first image signal corresponding to a first image that includes the reference image region;
determine a first image parameter value for a first image parameter of the reference image region in the first image, using pixel intensities of pixels associated with the reference image region in the first image signal;
determine a second image parameter value of the first image parameter based on the first image parameter value;
adjust the first image, or a subsequent image captured by the imaging sensor, using the second image parameter value, wherein responsive to a potential target image region corresponding to a second aircraft having a third image parameter value substantially equal to the first image parameter value of the reference image region, the adjustment improves visibility of the second aircraft in the first image or the subsequent image; and
cause the first image, or the subsequent image captured by the imaging sensor, to be displayed on a display device, responsive to adjusting the first image or the subsequent image captured by the imaging sensor.

12. A method comprising:
capturing images by an imaging sensor mounted on an aircraft at a fixed position and orientation with respect to the aircraft, a predetermined portion of the aircraft appearing as a reference image region at a fixed location across the images captured by the imaging sensor, the reference image region having visual characteristics known to a processor communicatively coupled to the imaging sensor; and
receiving, by the processor, a first image signal captured by the imaging sensor, the first image signal corresponding to a first image that includes the reference image region;
determining, by the processor, a first image intensity range of the reference image region in the first image, the first image intensity range representing a range of pixel intensities of pixels associated with the reference image region in the first image signal;
determining, by the processor, a gain value based on the first image intensity range for modifying the first image or a subsequent image; and
causing, by the processor, a second image signal, received from the imaging sensor subsequent to the first image signal, to be amplified using the gain value, and causing the reference image region in a second image corresponding to the second image signal to have a second image intensity range different from the first image intensity range, wherein responsive to a potential target image region corresponding to a second aircraft having a third image intensity range similar to the first image intensity range of the reference image region, amplifying the second image signal improves visibility of the second aircraft in the second image.

13. The method of claim 12, wherein causing the second image signal to be amplified using the gain value includes adjusting a gain of an amplifier coupled to the imaging sensor based on the gain value.

14. The method of claim 12, wherein causing the second image signal to be amplified using the gain value includes amplifying pixel intensity values of the second image using the gain value.

15. The method of claim 12, wherein the first image is a color image, and wherein determining the first image intensity range of the reference image region in the first image includes:
- obtaining a monochrome image using the first image; and
- determining the first image intensity range based on the monochrome image.

16. The method of claim 12 further comprising:
- identifying the potential target image region corresponding to the second aircraft in the second image responsive to amplifying the second image signal.

17. The method of claim 12 further comprising:
- determining, by the processor, a midpoint of the first image intensity range associated with the reference image region in the first image;
- determining, by the processor, an offset value based on the midpoint of the first image intensity range; and
- shifting, by the processor, the second image signal by the determined offset value such that a midpoint of the second image intensity range of the reference image region in the second image is different than the midpoint of the first image intensity range of the reference image region in the first image.

18. The method of claim 12, wherein the gain value is a first gain value and the method further comprising:
- receiving, by the processor, an input command to adjust the first gain value to a second gain value; and
- causing, by the processor, the second image signal or a third image signal subsequent in time to the second image signal to be amplified using the second gain value.

19. The method of claim 12, wherein the imaging sensor is configured to sense at least one of:
- visible light;
- near infrared (IR) waves;
- shortwave IR waves;
- mid-wave IR waves;
- longwave IR waves;
- millimeter waves; and
- ultraviolet waves.

20. The method of claim 12, wherein the second image intensity range is equal to a maximum image intensity range supported by a display device of the aircraft.

\* \* \* \* \*